United States Patent
Linkewitsch

(10) Patent No.: US 7,215,685 B2
(45) Date of Patent: May 8, 2007

(54) FRAME ALIGNING DEFRAMER

(75) Inventor: Niklas Linkewitsch, Evessen (DE)

(73) Assignee: Intel Corporation, Santa Clara, CA (US)

( * ) Notice: Subject to any disclaimer, the term of this patent is extended or adjusted under 35 U.S.C. 154(b) by 977 days.

(21) Appl. No.: 10/091,134

(22) Filed: Mar. 4, 2002

(65) Prior Publication Data

US 2003/0103529 A1 Jun. 5, 2003

Related U.S. Application Data

(60) Provisional application No. 60/334,116, filed on Nov. 30, 2001.

(51) Int. Cl.
*H04J 3/06* (2006.01)

(52) U.S. Cl. ........................................ 370/509

(58) Field of Classification Search ........ 370/509–511, 370/514, 515
See application file for complete search history.

(56) References Cited

U.S. PATENT DOCUMENTS

| | | | | |
|---|---|---|---|---|
| 4,002,845 A * | 1/1977 | Kaul et al. ................. | 370/509 |
| 5,333,148 A * | 7/1994 | Tsubaki et al. ............. | 375/229 |
| 5,442,405 A * | 8/1995 | Taniguchi et al. .......... | 348/525 |
| 5,937,016 A * | 8/1999 | Choi .......................... | 375/341 |
| 5,991,308 A * | 11/1999 | Fuhrmann et al. ..... | 370/395.53 |
| 6,049,577 A * | 4/2000 | Gothe et al. ................ | 375/368 |
| 6,081,570 A * | 6/2000 | Ghuman et al. ............ | 375/368 |
| 6,154,456 A * | 11/2000 | Rakib et al. ................ | 370/342 |
| 6,359,933 B1 * | 3/2002 | Aslanis et al. .............. | 375/260 |
| 6,445,719 B1 * | 9/2002 | Schneider et al. .......... | 370/506 |
| 6,704,890 B1 * | 3/2004 | Carotti et al. ............... | 714/700 |
| 6,741,615 B1 * | 5/2004 | Patwardhan et al. ........ | 370/514 |

* cited by examiner

*Primary Examiner*—Chau Nguyen
*Assistant Examiner*—Kerri M Rose
(74) *Attorney, Agent, or Firm*—Fish & Richardson P.C.

(57) ABSTRACT

A method is disclosed of aligning a frame in a digital communication system. The method includes comparing a portion of a received data sequence to a portion of a predetermined sequence. If the total number of comparison errors does not exceed a tolerance threshold that is greater than zero then the frame is aligned.

18 Claims, 1 Drawing Sheet

FRAME ALIGNING DEFRAMER

CROSS-REFERENCE TO RELATED APPLICATIONS

This application claims priority from U.S. Provisional Application No. 60/334,116, filed Nov. 30, 2001, and titled A DEFRAMER.

TECHNICAL FIELD

This invention relates to communications and more particularly to a deframer for digital communications.

BACKGROUND

Many digital communication systems format data in frames. In such systems, a frame alignment sequence is typically included at or near the front of each frame and is used to align the frame at the receiver.

DETAILED DESCRIPTION

Aligning a frame in a digital communication system includes comparing a portion of a received data sequence to a portion of a predetermined sequence. If the total number of comparison errors does not exceed a tolerance threshold that is greater than zero, then the frame is determined to be aligned.

Figure 1:
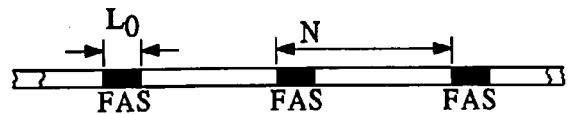
FIG. 1 shows a sequence of frames.

FIG. 1 shows a series of frames of length N with each frame beginning with a frame alignment sequence ("FAS") of length $L_0$. In one implementation that uses a ten gigabit forward-error-correction ("FEC") protocol, N is 255*128=32,640 bits and $L_0$ is 32 bits. A deframe circuit can be used to align the frames by, for example, regaining the timing signal that indicates the beginning of a frame and performing a bit alignment on the incoming signal.

Figure 2:
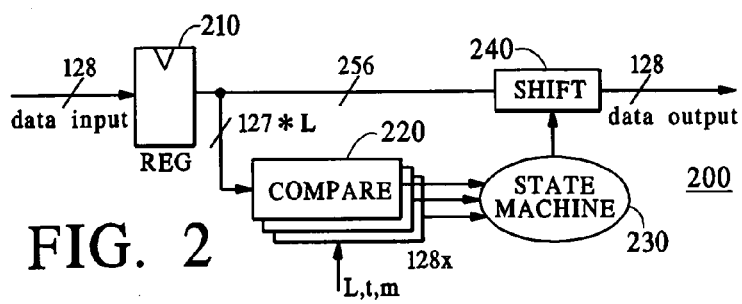
FIG. 2 shows an implementation of a deframer.

FIG. 2 shows a system 200 for aligning the frames. The implementation of system 200 is characterized by the three variables L, t, and m. "L" refers to the length of the FAS; "t" refers to the tolerance threshold; and "m" refers to the number of bits per symbol.

The system 200 receives incoming data on a bus having a width of 128 bits. The incoming data are partially buffered in a register 210, and 127+L bits are routed to a series of parallel compare circuits 220. The compare circuits 220 compare the incoming data to the FAS. In the system 200, there are 128 parallel compare circuits, each comparing L bits of the incoming data to the FAS.

In one implementation, the register 210 passes the first L-1 bits of the current 128 bits of incoming data to the compare circuits 220 without any buffering, and passes earlier data in the form of stored values of the 128 bits from the previous bus cycle. Thus, assuming that L=32, 159 bits are routed to the compare circuits 220. The first compare circuit compares incoming bits 0–31 to the FAS, the second compare circuit compares incoming bits 1–32 to the FAS, and so on. The $128^{th}$ compare circuit compares bits 127–158 to the FAS, with bits 128–158 representing the first L-1 bits from the current bus cycle. Thus, if the FAS begins in the incoming data of the previous bus cycle, then the compare circuits 220 will detect it, even if it overlaps with the incoming data for the current bus cycle. In a second implementation, buffering is performed at the parallel compare circuits 220 in lieu of, or in addition to, the register 210.

The variable "m" is set to a value of one in the system 200, indicating that there is one bit per symbol and resulting in the 128 parallel compare circuits 220 performing a bit-wise comparison of the L incoming data bits. Each of the parallel compare circuits 220 reports to the state machine 230 the total number of errors. An error is a mismatch between an incoming data bit and the corresponding bit of the FAS. The comparison can be performed in a variety of known ways, such as, for example, by using an exclusive-OR gate. The state machine 230 determines which, if any, of the 128 compare circuits is aligned with the FAS.

This determination is based on the value of the variable t, the tolerance threshold. If t=0, then no errors are tolerated and it is assumed by the state machine 230 that none of the compare circuits is aligned with the FAS unless a compare circuit finds a perfect match. If t=1, then the state machine 230 will allow one mismatch, and so on for higher values of t. Thus, higher values of t indicate that a system is more tolerant of bit errors in the received FAS.

Certain implementations provide the value of the variable t to the parallel compare circuits 220, allowing them to provide an early indication if the value of t is exceeded, and even allowing particular implementations to halt the comparison. However, whenever frame alignment is successful, at least one of the parallel compare circuits 220 will have determined a total number of comparison errors. In the implementation of FIG. 2, the parallel compare circuits 220 pass that value, the total number of comparison errors, to the state machine 230. A second implementation passes only an indication that there were t or fewer errors, but not the total number of errors. In each of these implementations, however, the total number of comparison errors is determined by part of the implementation whenever frame alignment is successful.

Multiple frames may be received before the state machine 230 detects a match. This may be caused, for example, by bit errors in the received data bits corresponding to the FAS. When the state machine 230 does detect a match, however, the state machine 230 sets the shift unit 240 to properly align the frame.

The shift unit 240 of system 200 receives 256 bits (i.e., two bus cycles worth of data) during each bus cycle and outputs only 128 bits, which is the normal bus width. A variety of other implementations are possible. The shift unit 240 aligns the incoming data with the beginning of a frame. This can be performed in many ways. In one implementation, the shift unit 240 shifts the incoming data so that the beginning of each frame occurs at bit zero of a bus cycle. In addition, in typical implementations, the size of the frame exceeds the width of the bus and the state machine 230 controls a timing signal indicating the bus cycles that contain the beginning of a frame. In another implementation, the shift unit 240 is implemented in software and achieves the shifting by setting a pointer to the beginning of each frame.

Other implementations can have different values for L, t, and m. Further, these values can be implemented in a variety of ways, such as, for example: hard-wired; settable in hardware such as, for example, with dual inline package ("DIP") switches; controlled by software, firmware, or micro code; or some combination of these techniques.

After the FAS is detected and frame alignment is achieved, the system 200 can continue to operate and perform a variety of functions. For example, system 200 can check subsequent FASs to ensure that the system 200 did not falsely lock on a data sequence, as opposed to the FAS sequence. A variety of techniques can be used to determine the expected location of the next FAS sequence. For example, if the frame length is a multiple, say X, of the bus width, then the state machine 230 can monitor every Xth output from the compare circuits 220. The state machine 230 can be significantly more complex if warranted by a particular application.

Figure 3:
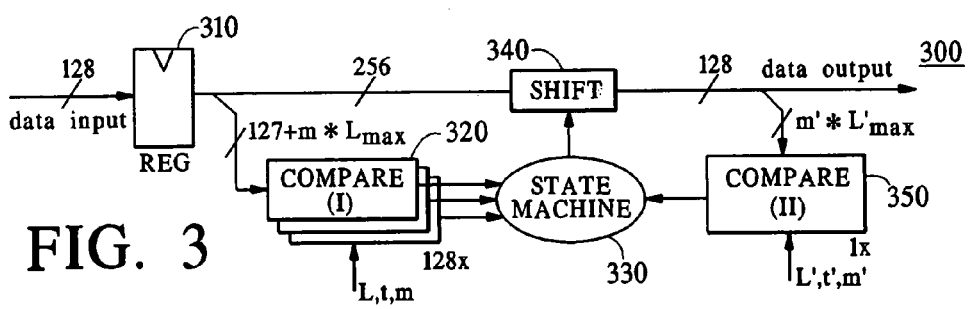
FIG. 3 shows a second implementation of a deframer.

FIG. 3 shows a system 300 that parallels the system 200 in FIG. 2 in many respects. Elements 310, 320, 330, and 340 correspond to elements 210, 220, 230, and 240 in FIG. 2. Accordingly, those elements in FIG. 3 will not be discussed in detail. FIG. 3 also shows an additional compare circuit 350. The compare circuit 350 compares incoming data from the shifter 340 with the FAS. In contrast to the compare circuits 320, there is only one compare circuit 350. Further, the compare circuit 350 can have different values, relative to the compare circuits 320, for the variables L, t, and m, as indicated by the use of L', t', and m' in FIG. 3.

FIG. 3 also introduces the terminology of $L_{max}$. Assuming that $L=L_{max}$ and m=1, then the parallel compare circuits 320 receive 127+L bits, with each of the 128 compare circuits receiving L bits, just as in the system 200 of FIG. 2, and the compare circuit 350 also receives L bits. However, the use of $L_{max}$ in the system 300 reflects the possibility that the value of L is not hard-wired and that the system 300 is set up to allow for values of L up to $L_{max}$. This allows certain implementations to be adaptable to different communication systems that use FASs of different lengths. It also allows certain implementations to use less than the entire length of the FAS.

In the system 300, compare circuit 350 performs a second search for the FAS in the incoming data. This second search can serve many purposes. In one implementation, the second search serves to confirm an indication of alignment from the first search performed by the parallel compare circuits 320. In a second implementation, the second search serves as a way to break a tie if the first search finds two incoming data sequences that might correspond to the FAS.

In one method of operating the system 300, the compare circuit 350 accepts as input the first m'* L' bits of each frame. Before the state machine 330 indicates a potential frame alignment, the compare circuit 350 can be disabled or ignored. However, once the state machine 330 indicates a potential frame alignment based on the first comparison using the parallel compare circuits 320, then the compare circuit 350 is used as a second check. In one such implementation, the shift unit 340 shifts the incoming data to align the frame and the compare circuit 350 compares bits in every bus cycle, leaving to the state machine 330 the task of determining which comparison result corresponds to the beginning of a frame and the FAS. In a second such implementation, the state machine 330 only enables the compare circuit 350 when the beginning of a frame arrives.

The comparison performed by the compare circuit 350 can be the same as, or different from, the comparisons performed by the parallel compare circuits 320. For example, the compare circuit 350 may perform a more intensive comparison than is performed by each of the parallel compare circuits 320. In one such implementation, the comparison is more space-intensive, meaning that the circuitry takes up more space than one of the compare circuits 320. Such space might be dedicated to the compare circuit 350 because there is only one. In a second implementation, the comparison is more calculation-intensive, possibly taking more time than the comparisons performed by each of the compare circuits 320. One implementation of system 300 uses a value of L' that is larger than L and, thus, more space is typically needed for the compare circuit 350 than for each of the parallel compare circuits 320. In certain implementations, using a value of L' that is larger than L will also result in a comparison that takes more time. Implementations also may vary the second comparison from the first comparison by setting m' or t' to different values than m and t, respectively.

Additionally, how the state machine 330 uses the information from the compare circuit 350 can vary in different implementations. In one implementation, the state machine 330 does not declare that the frame is aligned until the second comparison confirms the result of the first comparison.

The system 300 also indicates the number of bit lines that are input to the compare circuits 320 and 350 for different values of the variable m. Specifically, the implementation of the system 300 shows that $127+m*L_{max}$ bits are input to the compare circuits 320, and that $m'*L_{max}$ bits are input to the compare circuit 350. The use of $L_{max}$, as stated earlier, reflects that the system 300 is hard-wired to work for values of L up to $L_{max}$ and that L can be set dynamically.

FIG. 3 also refines the definition of L and $L_{max}$. In the system 300, L refers to the number of symbols being compared, and $L_{max}$ refers to the maximum number of symbols that can be compared. Thus, the total number of bits being compared by the parallel compare circuits 320 is the number of symbols multiplied by the bits per symbol, or m*L. When m=1, L still refers to the number of symbols being compared, but each symbol is a single bit. Thus, the refinement of the definitions of L and $L_{max}$ is consistent with FIG. 2.

When values of m greater than 1 are used, the implementation is said to operate on multi-bit symbols of m bits, rather than on single bits. operating on multi-bit symbols rather than individual bits allows for a variety of different implementations.

In one implementation that operates on multi-bit symbols, a compare circuit only reports to a state machine the number of symbols having an error rather than the number of bits in error. Thus, if a symbol has more than one bit-error, the symbol is only counted as one symbol error. In general, for a given value of t, such a system will be more tolerant of bit errors than a system operating on individual bits.

In a second implementation that operates on multi-bit symbols, the results of symbol comparisons are shared among the various parallel compare circuits. This allows the parallel compare circuits to be implemented in a smaller amount of space. In one such implementation of the system 300, L=8 and m=4 so there are 32 bits being compared in each of the parallel compare circuits 320, in groups of four bits. In this implementation, the first 16 FAS bits are random and are then repeated to complete the 32 FAS bits. Thus, the first four symbols and the last four symbols are compared to the same bits. Symbol comparisons are shared, in this implementation, among the various parallel compare circuits 320 as appropriate. For example, the first parallel compare circuit compares bits 0–31 to the 32 FAS bits. However, bits 0–15 and 16–31 are compared to the same bits because the FAS bits repeat. Likewise, in the seventeenth parallel compare circuit, bits 16–31 and 32–47 are also each compared to the same bits because the FAS bits repeat. Further, the comparison that the first parallel compare circuit performs on bits 16–31 is exactly the same as the comparison that the seventeenth parallel compare circuit needs to perform. Thus, the results of the comparison of the last four symbols, bits 16–31, in the first parallel compare circuit are shared with the seventeenth parallel compare circuit, and the hardware and the computations are not duplicated. Analogous sharing also occurs with other parallel compare circuits. In another implementation, in which m=1 but the FAS bits repeat, bit comparisons are shared between various parallel compare circuits, but there is no need to make, or share, a multi-bit error determination.

Figure 4:
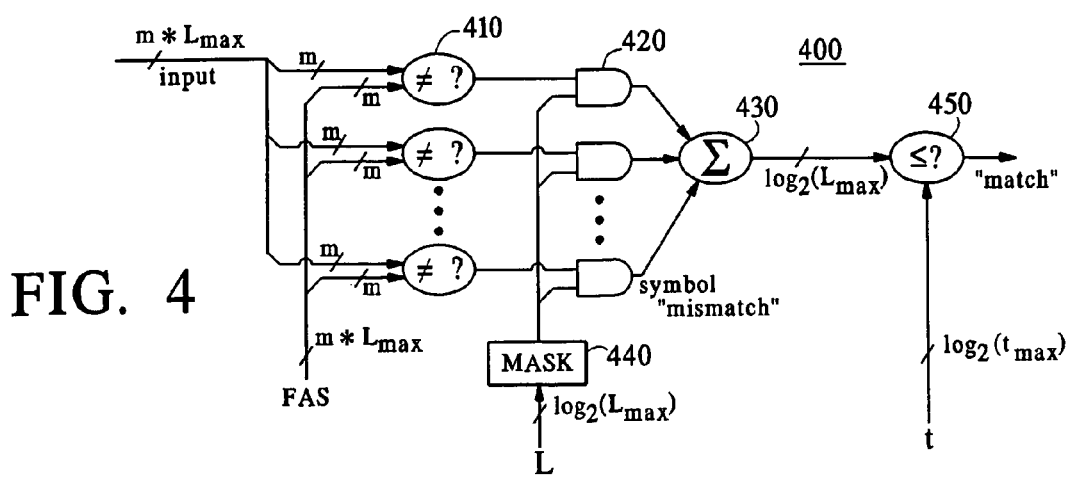
FIG. 4 shows an implementation of a compare circuit.
Like reference symbols in the various drawings indicate like elements.

FIG. 4 shows a circuit 400 for performing a multi-bit symbol comparison on incoming data. The circuit 400 is used, in one implementation, as one of the parallel compare circuits 320 in FIG. 3. The circuit 400 is hard-wired to receive $m*L_{max}$ bits and to perform up to $L_{max}$ comparisons using the $L_{max}$ comparators 410. Each comparator 410 compares m bits of incoming data with m bits of the FAS and determines if the symbols are perfect matches. The comparator 410 outputs a zero if there is a match and a one if there is not a match. Unless a mismatch is masked by one of the AND gates 420, the mismatch passes to the summer 430. The mask 440 is used, for example, if the value selected for L is less than $L_{max}$. In one implementation, $L_{max}$ is 12 but L is only 8. Accordingly, there are 12 AND gates 420 and the mask 440 is set to provide eight of them with a one, thus passing a mismatch indicator if present, and to provide four of them with a zero, thus blocking a mismatch indicator if present. In one implementation, the eight AND gates 420 that receive a one from the mask 440 correspond to the least significant m symbols.

The summer 430 computes and passes the sum, which is the total number of mismatched symbols, to a decision element 450 that determines if the sum is within the tolerance threshold t. That decision is passed, in one implementation, to a state machine as in FIG. 3.

FIG. 4 shows that the mask 440 receives $\log_2(L_{max})$ input lines to indicate the value of L. This number, when rounded up to the next integer value, corresponds to the number of bits necessary to represent $L_{max}$ different values. Thus, in the implementation in which $L_{max}$=12, 4 bits are used. Similarly, the decision element 450 has $\log_2(L_{max})$ input lines from the summer 430 and $\log_2(t_{max})$ input lines for the value of t, where $t_{max}$ is the maximum value of t.

The table below shows the probabilities of three common alignment problems, referred to as misfunctions, for a typical framing approach and two examples of tolerant framing. The first misfunction was discussed earlier and occurs when the deframer aligns with data in the frame rather than with the FAS. The second and third misfunctions refer to situations in which the deframer does not achieve an alignment, taking more than four frames and eight frames, respectively. Such delays are commonly caused by bit errors or by the comparisons being too strict.

The values in the table are derived from a standard state diagram (not shown) for the framer. Each state transition has a probability that depends on the parameters and the calculated probabilities are the sums of various probabilities associated with the state diagram.

The results assume that the probability of a bit error is 0.005. The typical framing approach used has only a single stage of comparison and has only one variable, L, which is set to 23. Although the typical framing approach used has only one variable, such an approach would correspond to a system in which m=1 and t=0 because it performs a bit-wise comparison and tolerates no errors. The first tolerant framing example has a first stage of comparison with L=24, m=1, and t=0, and a second stage of comparison with L=36, m=1, and t=2. The second tolerant framing example also uses two stages and varies from the first tolerant framing example only in the parameters of the first stage. In particular, the second tolerant framing example has a first stage of comparison with L=6, m=4, and t=1, and a second stage of comparison with L=36, m=1, and t=2.

| Probability of misfunction at Pbi = 0.005 | Standard Framing | Tolerant Framing I | Tolerant Framing II |
|---|---|---|---|
| Synchronized on payload data | $4.7 * 10^{-10}$ | $2.4 * 10^{-10}$ | $7.8 * 10^{-12}$ |
| Not synchronized after 4 frames | $1.4 * 10^{-2}$ | $2.6 * 10^{-4}$ | $8.1 * 10^{-8}$ |
| Not synchronized after 8 frames | $2.5 * 10^{-4}$ | $7.9 * 10^{-8}$ | $8.7 * 10^{-15}$ |

For each of the three misfunctions, or problems, analyzed, the data in the above table show that the probability of a misfunction decreased, when compared to the typical framing approach used, for the first tolerant framing example, and then decreased further for the second tolerant framing example.

The data show that the second and third misfunctions represent the highest probability of misfunction for each of the three examples analyzed. The data also show that the second tolerant framing example decreases the probability of the delays associated with the second and third misfunctions, when compared to the typical framing approach used, by approximately six orders of magnitude and eleven orders of magnitude, respectively.

These results are counter-indicated by the fact that increasing a deframer's tolerance to bit errors also increases, in general, the opportunities for the deframer to align on data instead of the beginning of the frame.

The probability of the first misfunction can generally be reduced by increasing the value of L. However, the probability of the second and third misfunctions can generally be reduced by decreasing the value of L and/or increasing the value of t. Thus, the value of L is often a tradeoff. In one design methodology, a value of L is chosen that results in a probability of the first misfunction of approximately $1*10^{-10}$. This design methodology also allows two designs to be compared. Assuming that both designs have selected values of L (possibly different from each other) that result in a probability of the first misfunction of approximately $1*10^{-10}$, then the designs can be compared by, for example, comparing the resulting probabilities for the second and third misfunctions. Designs may be compared in a variety of other ways, such as, for example, space required, computational complexity, and the probability of a misfunction other than the three discussed above.

One implementation is performed primarily in hardware and operates with optical communication systems having data rates of up to 12.5 gigabits/second.

A number of implementations have been described. Nevertheless, it will be understood that various modifications may be made. For example, implementations can be performed in, for example, software, firmware, micro code, hardware, or some combination. Further, features of implementations may be embodied in a process, a device, a combination of devices employing a process, or in a computer readable medium embodying instructions for such a process. The medium may be, without limitation, a floppy disk, a hard disk, RAM, ROM, firmware, or even electromagnetic waves encoding or transmitting instructions. Additionally, hardware components, including the buffers, registers, logic gates, and circuits described above, can be implemented, for example, as discrete devices, as a chip set, or in a single integrated circuit.

What is claimed is:

1. A method of aligning a frame in a digital communication system, the method comprising:
    comparing of a first portion of a received data sequence to a first portion of a predetermined sequence;
    determining whether a total number of comparison errors exceeds a tolerance threshold that is greater than zero; and
    aligning the frame if the threshold is not exceeded, wherein said aligning includes controlling a timing signal indicating a bus cycle that contains the beginning of the frame and shifting the received data sequence so that the beginning of the frame occurs at bit zero of the bus cycle.

2. The method of claim 1 wherein:
    the first portion of the received data sequence and the first portion of the predetermined sequence are compared in a bit-wise fashion, and
    the total number of comparison errors comprises a number of bits that are not perfectly matched.

3. The method of claim 1 wherein:
    the first portion of the received data sequence and the first portion of the predetermined sequence are compared in multi-bit symbols, and
    the total number of comparison errors comprises a number of symbols that are not perfectly matched.

4. The method of claim 1 further comprising determining the total number of comparison errors between the first portion of the received data sequence and the first portion of the predetermined sequence.

5. The method of claim 1 further comprising:
    comparing a second portion of the received data sequence to a second portion of the predetermined sequence;
    determining a second total number of comparison errors based on the second comparison; and
    determining whether the second total number of comparison errors exceeds a second tolerance threshold.

6. The method of claim 5 wherein the second portion of the received waves sequence equals the first portion of the received data sequence.

7. The method of claim 5 wherein the first comparison is performed before the second comparison.

8. The method of claim 5 wherein the second comparison is performed before the first comparison.

9. The method of claim 1 further comprising determining a length for the portion of the received data sequence and the portion of the predetermined sequence that are being compared.

10. The method of claim 1 further comprising determining the tolerance threshold.

11. The method of claim 1 further comprising using the method in a high-speed networking environment characterized by the existence of bit errors.

12. A method of aligning a frame containing a frame alignment sequence ("FAS"), the method comprising:
    comparing a portion of a received sequence to a portion of the FAS;
    allowing a tolerance to bit errors in the received sequence by using a tolerance threshold greater than zero; and
    accepting an error in the comparisons by aligning the frame if the tolerance threshold is no smaller than a total number of comparison errors, wherein said aligning includes controlling a timing signal indicating a bus cycle that contains the beginning of the frame and shifting the received data sequence so that the beginning of the frame occurs at bit zero of the bus cycle.

13. The method of claim 12 wherein:
    the comparison comprises performing a bit-wise comparison, and
    the total number of comparison errors comprises a number of bit errors in the comparison.

14. The method of claim 12 wherein:
    the comparison comprise comparing in multi-bit symbols, and
    the total number of comparison errors comprises a number of symbols in error.

15. A computer program, residing on a tangible computer-readable medium, for aligning a frame in a digital communication system, the computer program comprising instructions for causing a computer to perform the following operations:
    compare a portion of a received sequence to a portion of a predetermined sequence;
    determine whether a total number of comparison errors exceeds a tolerance threshold that is greater than zero; and
    align the frame if the threshold is not exceeded, wherein said aligning includes controlling a timing signal indicating a bus cycle that contains the beginning of the frame and shifting the received data sequence so that the beginning of the frame occurs at bit zero of the bus cycle.

16. The computer program of claim 15 wherein:
    the instructions for causing the computer to compare comprise instructions for causing the computer to perform a bit-wise comparison, and
    the total number of comparison errors comprises a number of bit errors in the comparison.

17. A device for use in aligning a frame, the device comprising:
    parallel compare circuits configured to receive data and a predetermined sequence, and to produce a comparison result;
    a state machine configured to receive the comparison result from the parallel compare circuits and to produce a frame alignment determination; and
    an additional compare circuit, not in parallel with the parallel compare circuits, the additional compare circuit being configured to receive data and the predetermined sequence and to produce another comparison result which the state machine is further configured to receive.

18. The device of claim 17 wherein:
    each of the parallel compare circuits is configured to produce a separate comparison result, and
    the state machine is configured to receive each of the separate comparison results.

* * * * *